Dec. 10, 1929.   T. H. STRACHAN   1,738,932
STEELYARD STIRRUP FOR WEIGHING SCALES
Filed April 16, 1925
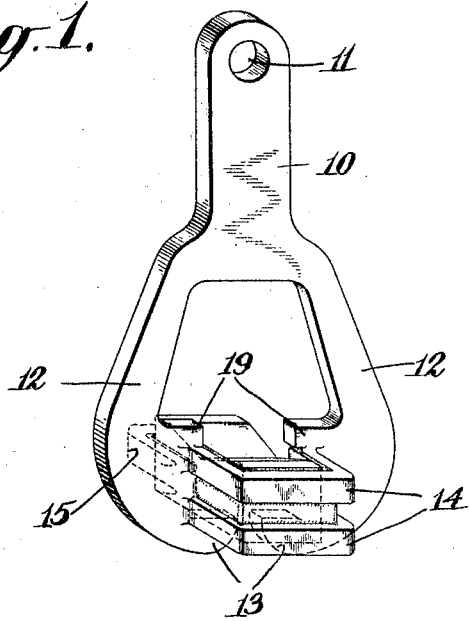
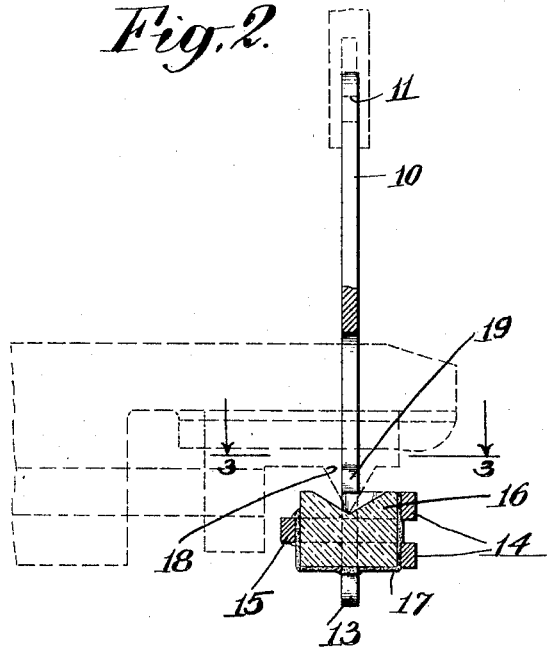
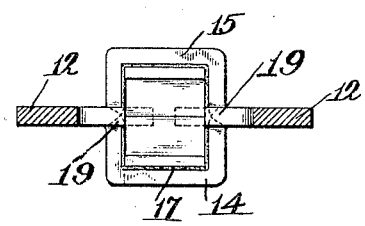

Patented Dec. 10, 1929

1,738,932

UNITED STATES PATENT OFFICE

THOMAS HENRY STRACHAN, OF DAYTON, OHIO, ASSIGNOR TO DAYTON SCALE COMPANY, OF DAYTON, OHIO, A CORPORATION OF NEW JERSEY

STEELYARD STIRRUP FOR WEIGHING SCALES

Application filed April 16, 1925. Serial No. 23,580.

The invention relates to steelyard hook stirrups for weighing scales. Heretofore such steelyard stirrups have usually been formed from sheet metal and the sheet metal has been cut away to provide a socket within which a steel shell is fitted. Within this shell it has been the practice to support a pivot bearing. This pivot bearing has previously been of metal.

The present invention has for its objects the provision of a stirrup of simpler construction than those heretofore employed. All portions of the stirrup are made integral and from one piece of sheet metal. The use of the separate metal shell is obviated and the one piece steelyard element is adapted to of itself form a support for an agate bearing. Provision is made for supporting the agate bearing at the sides and at the bottom and certain portions of the steelyard are utilized for forming the friction steel elements which keep the cooperating pivot in the proper position in the agate bearing.

In the drawings,

Fig. 1 is a perspective view of my improved steelyard loop.

Fig. 2 is a part vertical sectional view of the steelyard stirrup with the agate bearing in place therein. This view also shows in dotted lines the cooperating pivot on the nose end of the lever.

Fig. 3 is a detail sectional view taken on line 3—3 of Fig. 2.

The stirrup proper is made entirely of sheet metal construction. It is struck up from a flat metal blank and comprises a shank portion 10 apertured at the top 11 to receive a suitable hook connection. The shank portion 10 is bifuracted with a pair of arms 12, which arms extend around and at their lower ends are provided with shouldered portions 13 which form a bottom support for the agate bearing. Struck up laterally in opposite directions from the sheet metal member are a plurality of loops 14, 15. Two loops 14 extend in one direction and to one side of the plane of the steelyard stirrup and a single loop 15 extends in the opposite direction. It will be understood that these loops are integral with the sheet metal which forms parts 10, 12 and 13. The loops 14 and 15 form side walls to receive an agate bearing 16. This bearing is preferably cemented in place by means of the cement 17. Just above the upper loop 14 the arms 12 are provided with inwardly extending integral portions 19 which form friction steel elements to cooperate with the sides of the pivot shown in dotted lines at 18. The stirrup heretofore described is comparatively inexpensive to manufacture. The agate bearing 16 is supported both at the sides and at the bottom respectively by the loops 14, 15, and the projections 13. Parts 19 which are integral serve as friction steel elements. The use of all loose and separate pieces is obviated and agate bearings may be readily employed and can be held securely in fixed position in the stirrup.

1. A bearing stirrup for a weighing scale comprising a one piece sheet metal member having a shank portion and an integral loop portion extending transversely of the shank portion and consisting of a continuous strip with each end joining the member to form a wall to retain a bearing.

2. A bearing stirrup for a weighing scale comprising a one piece sheet metal member having a shank portion, an integral loop portion extending transversely of the shank portion a second loop portion extending oppositely to said first named loop portion, each of said loop portions consisting of a continuous strip with both ends joining the member to form a bearing seat open at the top and bottom.

3. A bearing stirrup for a weighing scale comprising a one piece sheet metal member having a shank portion provided with offset extension at one end and an integral loop portion extending transversely of the shank portion and consisting of a continuous strip with each end joining the member, said loop portion coacting with said extension to form a seat for a bearing.

4. A bearing stirrup for a weighing scale comprising a one piece sheet metal member having a bifurcated shank portion with an offset portion on each bifurcation extending toward each other and loop portions extending oppositely of each other and transversely of the shank and each consisting of a continuous strip joined at both ends to the member.

5. A bearing stirrup for a weighing scale comprising a flat shank consisting of an integral metallic piece and a continuous integral loop portion extending in angular relationship to the plane of the shank to form a single bearing aperture open at the top and bottom.

6. A stirrup for a weighing scale comprising a flat shank lying in a single plane and consisting of an integral metallic piece provided with an aperture to accommodate a bearing and continuous loop portions adjacent the aperture and extending beyond the limits of said aperture to provide retaining walls for a bearing.

In testimony whereof I hereto affix my signature.

THOMAS HENRY STRACHAN.